United States Patent
Bloch et al.

(10) Patent No.: US 8,224,984 B2
(45) Date of Patent: Jul. 17, 2012

(54) METHOD FOR QUALITY ANALYSIS DURING TRANSMISSION OF REAL-TIME CRITICAL DATA IN PACKET-ORIENTED NETWORK

(75) Inventors: Anat Bloch, Munich (DE); Thomas Lindner, Munich (DE); Manfred Riedel, Munich (DE)

(73) Assignee: Siemens Aktiengesellschsft, Munich (DE)

( * ) Notice: Subject to any disclaimer, the term of this patent is extended or adjusted under 35 U.S.C. 154(b) by 986 days.

(21) Appl. No.: 10/739,940

(22) Filed: Dec. 19, 2003

(65) Prior Publication Data

US 2004/0153565 A1      Aug. 5, 2004

(30) Foreign Application Priority Data

Dec. 20, 2002  (DE) .................................. 102 60 301

(51) Int. Cl.
*G06F 15/16* (2006.01)
*H04B 17/00* (2006.01)
*H04W 72/00* (2009.01)
*H04M 1/64* (2006.01)

(52) U.S. Cl. ..................... 709/236; 709/232; 455/452.2; 455/67.13; 379/88.01

(58) Field of Classification Search .................. 709/232, 709/236; 379/88.01; 370/395.21, 352, 235, 370/252; 455/452.2, 67.13
See application file for complete search history.

(56) References Cited

U.S. PATENT DOCUMENTS

| | | | |
|---|---|---|---|
| 6,269,331 B1 * | 7/2001 | Alanara et al. ................. | 704/205 |
| 6,347,081 B1 * | 2/2002 | Bruhn ........................... | 370/337 |
| 6,366,959 B1 * | 4/2002 | Sidhu et al. .................... | 709/231 |
| 6,917,587 B1 * | 7/2005 | Sarkar et al. ................... | 370/230 |
| 2002/0119773 A1 * | 8/2002 | Niemela ........................ | 455/423 |
| 2002/0120440 A1 * | 8/2002 | Zhang ............................ | 704/215 |
| 2002/0136162 A1 * | 9/2002 | Yoshimura et al. ............ | 370/229 |
| 2003/0115331 A1 * | 6/2003 | Xie et al. ....................... | 709/227 |
| 2004/0062274 A1 * | 4/2004 | Hakansson et al. ........... | 370/468 |
| 2004/0071084 A1 * | 4/2004 | El-Hennawey et al. ....... | 370/230 |
| 2004/0073692 A1 * | 4/2004 | Gentle et al. .................. | 709/231 |
| 2005/0157648 A1 * | 7/2005 | Miller et al. .................. | 370/235 |

FOREIGN PATENT DOCUMENTS

| | | |
|---|---|---|
| EP | 1 010 267 | 2/2002 |
| WO | WO 97/27686 | 7/1997 |
| WO | WO 99/10995 | 3/1999 |
| WO | WO 00/31996 | 6/2000 |

OTHER PUBLICATIONS

Schulzrinne, Casner; "RTP Profile for Audio and Video Conferences with Minimal Control", Revision of RFC 1890, Internet draft, Jul. 20, 2001, pp. 1-41.*
Zopf; "Real-time Transport Protocol (RTP) Payload for Comfort Noise (CN)"; RFC 3389, Sep. 2002.*
Yuming Jiang et al., "Providing Quality of Service Monitoring: Challenges and Approaches", IEEE, Apr. 10, 2000, pp. 115-128, XP 010376678.

* cited by examiner

*Primary Examiner* — Lynn Feild
*Assistant Examiner* — Lin Liu
(74) *Attorney, Agent, or Firm* — Staas & Halsey LLP

(57) ABSTRACT

At least first and second terminals are connected to a packet-oriented network, with real-time critical data being transmitted via payload data frames from the first terminal to the second terminal. In cases in which no real-time critical data is available for transmission, fill frames signaling this fact are transmitted at a minimum transmission rate from the first to the second terminal. The transmission quality is determined by taking into consideration the payload data frames and fill frames received at the second terminal within a particular period.

11 Claims, 3 Drawing Sheets

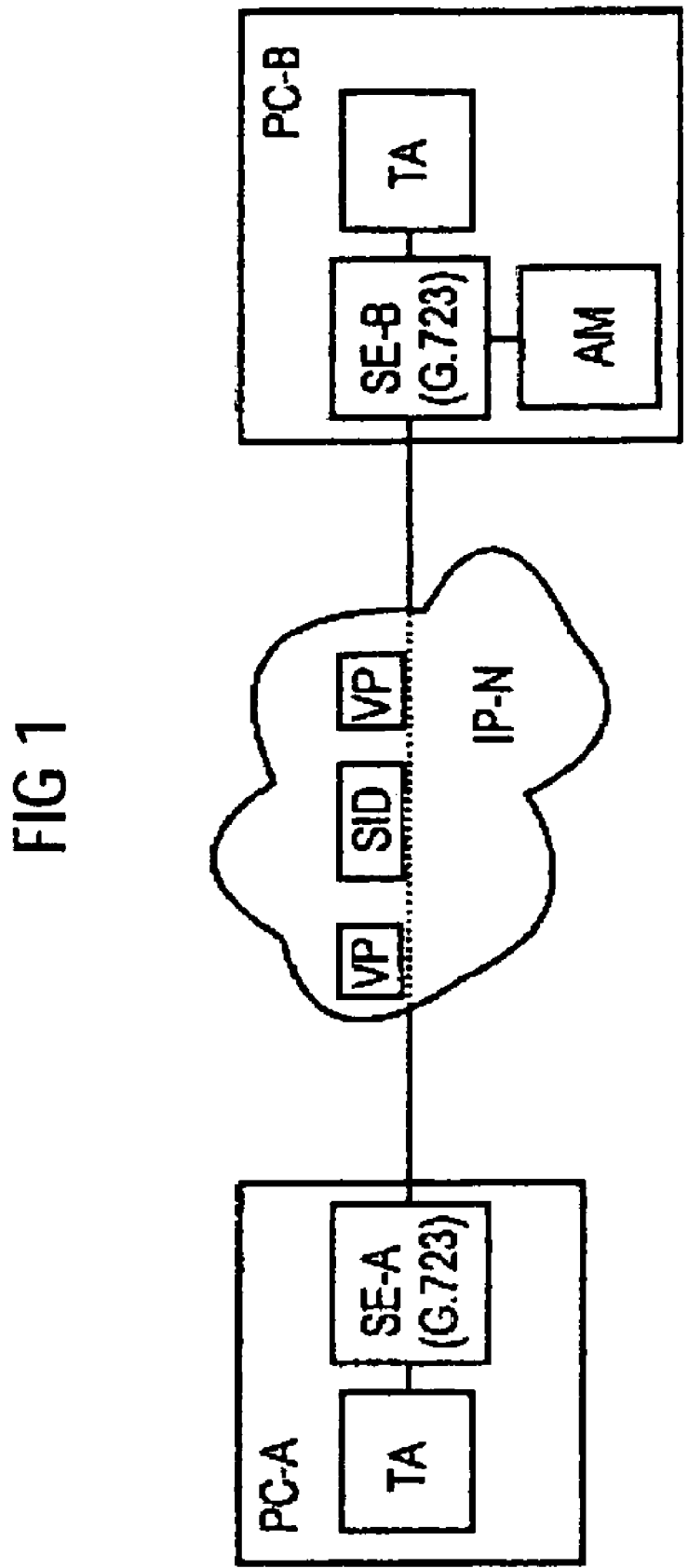

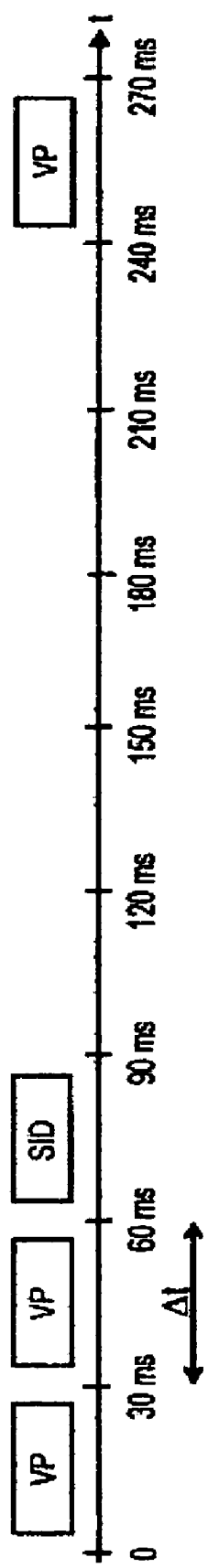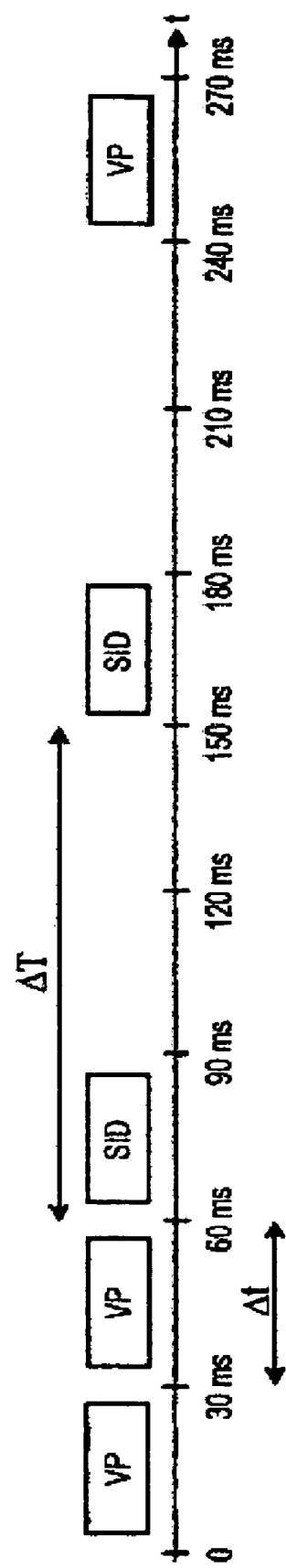

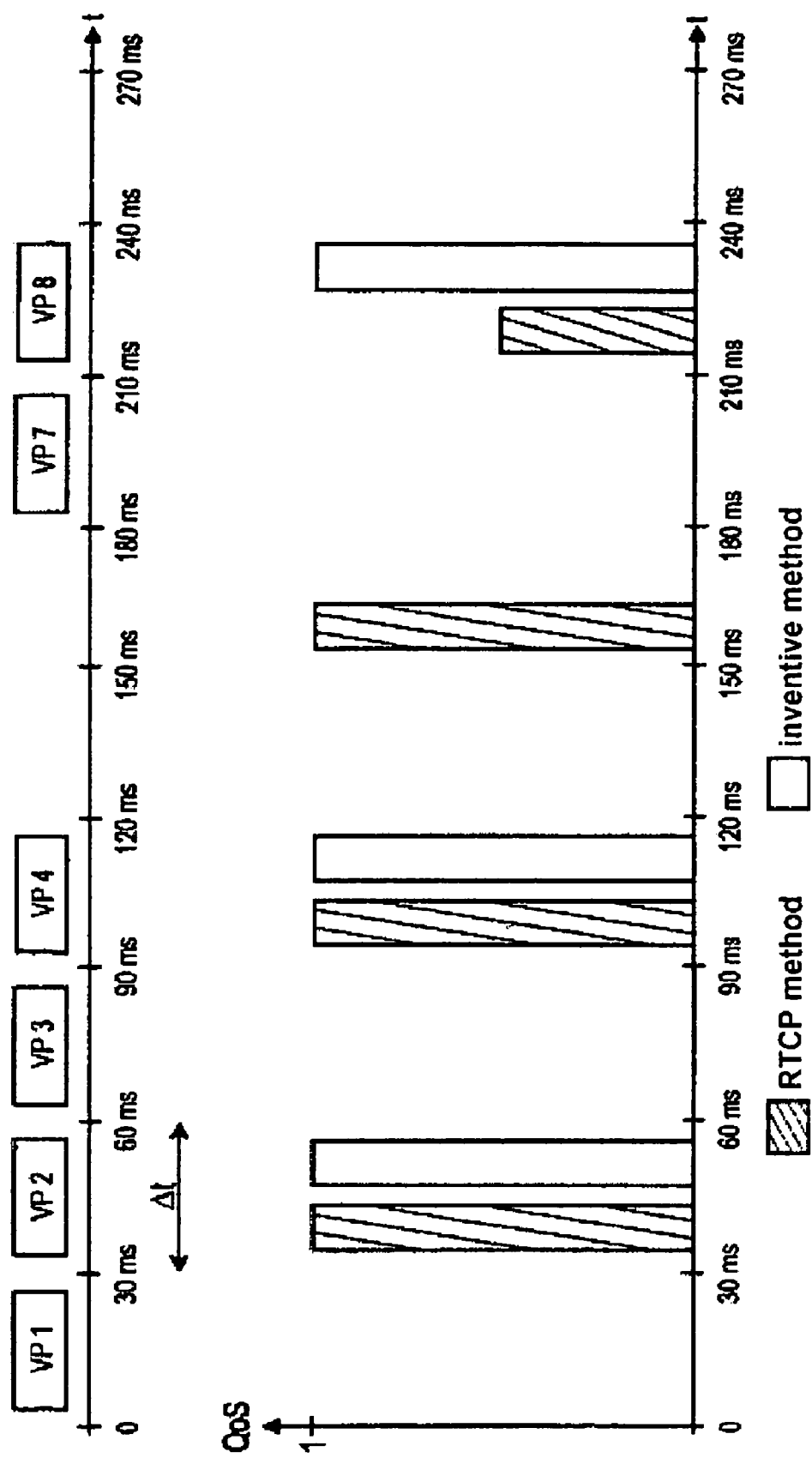

METHOD FOR QUALITY ANALYSIS DURING TRANSMISSION OF REAL-TIME CRITICAL DATA IN PACKET-ORIENTED NETWORK

CROSS REFERENCE TO RELATED APPLICATIONS

This application is based on and hereby claims priority to German Application No. 10260301.4 filed on Dec. 20, 2002, the contents of which are hereby incorporated by reference.

BACKGROUND OF THE INVENTION

1. Field of the Invention

The present invention relates to a method for an analysis of the transmission quality—frequently referred to in the literature as Quality of Service, QoS for short—in a packet-oriented network—especially an IP (Internet Protocol)-based network.

2. Description of the Related Art

As a result of an increasingly global alignment of companies, the use of telecommunication services to transfer voice and data is constantly increasing. The result of this is that the costs caused by these telecommunication services are constantly rising and are becoming a significant cost factor for the companies, which are looking for opportunities to reduce these costs. Local and global computer networks such as an 'Intranet' or the 'Internet' provide one option of transferring data cheaply and all around the world. In such cases real-time critical data, for example voice and video data, is increasingly transferred over these types of local and global packet-oriented networks.

For transfer of real-time critical data over packet-oriented networks there are not as a rule any constant transmission conditions—also frequently referred to in the literature as isochronous transmission conditions, because of a combination of the widest variety of influencing factors, such as the network used, the transmission protocol used etc. The result of the changing, i.e. non-isochronous, transmission conditions is an adverse effect on the quality of the transferred real-time data. One option for compensating for non-isochronous transmission conditions is the provision of so-called receive memories—also known in the literature as receiver buffers—which allow buffering of the received data and subsequent isochronous reading of the data. The setting of a receive buffer is in this case always a compromise between the highest possible compensation for non-isochronous transmission of the real-time critical data—and thereby a large receive buffer—and a minimum possible delay to the transmitted data—and thereby a small receive buffer.

A known method for determining the transmission quality in a packet-oriented network is what is known as the "ping" method in accordance with the ICMP (Internet Control Message Protocol) protocol, with which a test packet is sent and the receive delay is determined in the network by the response packet received—frequently known in the literature as the delay. A disadvantage of the ping method is that conventional data packets and not data packets for the transfer of real-time critical data—frequently referred to in the literature as VoIP (Voice over Internet protocol) packets are used for determining the transmission quality. As a result of different transmission mechanisms and thereby also of a different transmission behavior for real-time critical data and non-real-time critical data packets in the network, the special conditions of isochronous transmission cannot be sufficiently taken into account with the known method.

Furthermore, it has already been proposed in German Patent Application Number 102 10 651.7 that receive times of RTP (Real Time Protocol) data packets transferred in one direction are determined and so-called intermediate packet times calculated by continuous subtraction of the receive times of two consecutive data packets in each case. The sequence of intermediate packet times be used in a simple way to detect whether the data packets will be transported isochronously, or non-isochronously.

A further variable for the transmission quality in packet-oriented network is the number of data packets lost in data transmission in relation to the number of data packets transferred or expected at the recipient. Such a value is provided by default in the RTCP (Real Time Control Protocol) Standard by what is known as the "fraction lost field".

A disadvantage of the method used within the context of the RTCP Standard however is that the time component of data transmission is not taken into account when determining the lost data packets. Thus with the method in accordance with RTCP Standard checking as to whether all previous data packets have been received is only undertaken on the basis of the last data packet received. No check is made on whether the data packet corresponding to a particular point in time was actually received at this time. If a connection is completely interrupted at a particular point, this fact is not fully reflected by the information contained in the "fraction lost field" (see FIG. 3 of the exemplary embodiment).

In particular a problem arises with send units that use what is known as "Voice Activity Detection". With this method a send unit detects that there is not currently any voice data to be sent and sends what is known as an SID (Silence Insertion Descriptor) packet. As a rule data packets containing voice data are only sent again when there is voice data present.

SUMMARY OF THE INVENTION

An object of the present invention is to account for the timing component of data transmission for analysis of the transmission quality in a packet-oriented network.

The invention is based on a system in which at least a first and a second terminal are connected to a packet-oriented network, with real-time critical data being sent via payload data frames from the first terminal to the second terminal. In cases in which there is not currently any real-time critical data for transmission, SID frames signaling this fact—referred to subsequently in this document as fill frames—are transmitted at a minimum transmission rate from the first to the second terminal. To determine the transmission quality, the payload data frames and the fill frames received at the second terminal within a certain period of time are then considered.

By sending fill frames at a minimum transmission rate the method in accordance with the invention can also be used with send units which support "Voice Activity Detection".

A significant advantage of the method in accordance with the invention lies in the fact that the method in accordance with the invention can be implemented with only slight effort in existing systems.

A further advantage of the method in accordance with the invention lies in the fact that the transmission quality is determined exclusively on the basis of information which is present at the unit receiving the data frames. This means that it takes very little effort to determine the transmission quality.

A further advantage is that the method in accordance with the invention can be used to determine the transmission quality at any reporting points or during any given period between two freely-selectable reporting points, whereas with the method according to the RTCP Standard only the total period of time since the beginning of the data transmission can be observed.

One of the advantages of the embodiments of the invention is that the ability to set the minimum data transmission rate provides a simple way of adapting the method to different transceivers and allows the accuracy of the method to be improved or checked.

BRIEF DESCRIPTION OF THE DRAWINGS

These and other objects and advantages of the present invention will become more apparent and more readily appreciated from the following description of an exemplary embodiment, taken in conjunction with the accompanying drawings of which:

FIG. 1 is a block diagram of the main functional units involved in a method in accordance with the invention;

FIG. 2a is a block diagram of data transmission starting from the send unit with conventional "Voice Activity Detection";

FIG. 2b is a block diagram of data transmission in accordance with the present invention starting from a send unit with "Voice Activity Detection"; and FIG. 3 is a combined timing diagram and bar chart for comparing how transmission quality is determined typically with how it is determined according to the present invention.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

FIG. 1 is a block diagram of a communication system with a first terminal PC-A and a second terminal PC-B, connected to each other via an IP (Internet Protocol)-oriented network IP-N. Data is transferred over the IP-oriented network IP-N using data packets. In the exemplary embodiment shown here the first and the second terminal PC-A, PC-B, are each implemented by a Personal Computer, with a telephone application TA running on the Personal Computer. Alternatively the terminals PC-A, PC-B can also be implemented by so-called IP phones or conventional telephones which are connected via the appropriately configured adapters to the IP-oriented network IP-N.

The first terminal PC-A and the second terminal PC-B are connected to the IP-oriented network IP-N via transceivers SE-A, SE-B implemented in the terminals PC-A, PC-B in each case. In the exemplary embodiment shown here data is transmitted over the IP-oriented network IP-N by the transceivers SE-A, SE-B in accordance with transmission standard G.723 of the ITU (International Telecommunication Union)—indicated by the characters G.723 in brackets. Alternatively ITU transmission standard G.711 can also be used. Voice data transferred by the telephone application TA to the transceiver SE-A, SE-B is packed into payload frames VP—frequently referred to in the literature as "voice frames", which in their turn are transferred over the IP-oriented network packed into data packets (not shown). The transceivers SE-A, SE-B of the terminals PC-A, PC-B each support the so-called "Voice Activity Detection". With "Voice Activity Detection" the transceiver SE-A, SE-B detects that there is currently no voice data to be sent and sends a so-called SID (Silence Insertion Descriptor) frame—referred to hereafter as fill frame SID. As a rule payload data frames containing voice data are not sent until there is new voice data available to send.

In the second terminal PC-B an evaluation module AM, connected to the transceiver SE-B, is implemented for determining the transmission quality The evaluation module AM detects the payload data frames VP and fill frames SID received at the transceiver SE-B and from these calculates the transmission quality for the IP-oriented network IP-N. In cases in which terminals PC-A, PC-B are realized by IP-Phones or conventional telephones, the evaluation module AM can be implemented in a separate device—not shown—which is either connected directly or via the IP-oriented network IP-N to the IP phones or conventional telephones.

The invention is explained in more detail below on the basis of unidirectional data transfer from the first terminal PC-A to the second terminal PC-B.

FIG. 2a is a block diagram of data transfer starting from send unit SE-A with "Voice Activity Detection" in accordance with the prior art. "Voice Activity Detection" is defined in such a way that a send unit, in addition to a first fill frame SID, sends out a further fill frame SID if the ambient noise exceeds a limit value that can be set. With the exemplary embodiment shown in FIGS. 2a and 2b it is assumed that the ambient noise is not exceeding this limit value so that with the conventional method no further fill frame SID will be sent.

It is further assumed that data is transmitted via the IP-oriented network IP-N in accordance with ITU transmission standard G.723. With transmission standard G.723, the duration of the payload data frame is $\Delta t=30$ ms.

With ITU transmission standard G.711, the payload data frame duration would be $\Delta t=10$ ms. FIG. 2a shows an overall transmission duration of 270 ms.

In the exemplary embodiment shown here voice data is available for transmission at points $t=0$ ms, $t=30$ ms and $t=240$ ms, which will be transferred by the transceiver SE-A over the IP-oriented network IP-N. This the transceiver SE-A send a payload data frame VP at points $t=0$ ms and $t=30$ ms respectively. Since at point $t=60$ ms there are no voice data present, transceiver SE-A sends a fill frame SID. Like the payload data VP frames, the duration of the fill frames is also 30 ms. Since new voice data to be transmitted is only available at point $t=240$ ms, no further data frames are transferred over the IP-oriented network IP-N until point $t=240$ ms.

FIG. 2b is a block diagram of data transfer starting from send unit SE-A with "Voice Activity Detection" in accordance with the present invention. In this example, data is again transmitted over the IP-oriented network IP-N in accordance with the ITU G.723 transmission standard. The minimum transmission rate for fill frames SID is set in this case in this case such that the time $\Delta T$ between the transmission of two fill frames SID is greater by maximum factor $X=3$ than the payload frame duration $\Delta t$. The time $\Delta T$ between the transmission of two fill frames SID is thus a maximum of $\Delta T=90$ ms.

In the exemplary embodiment shown here voice data is available for transmission at points $t=0$ ms, $t=30$ ms and $t=240$ ms, which will be transferred by the transceiver SE-A over the IP-oriented network IP-N. Thus the transceiver SE-A sends a payload data frame VP at points $t=0$ ms and $t=30$ ms respectively. Since at point $t=60$ ms there is no voice data present, transceiver SE-A sends a fill frame SID. The duration of the fill frame is again 30 ms. After expiry of $\Delta T=90$ ms after the detection of the first fill frame SID, i.e. at point $t=150$ ms, the transceiver SE-A again sends a fill frame SID. Since new voice data is available again for transmission at point $t=240$ ms, at point $t=240$ ms—like the method according to the prior art—a payload data frame is transferred.

By transferring fill frames SID with a minimum transmission rate, i.e. at constant intervals, the method in accordance with the invention can be used to distinguish whether a connection is interrupted, or whether at the current point in time no voice data is present for transfer, i.e. there is a pause in the conversation. This is not possible with the method according to the prior art.

In accordance with the invention, the evaluation module AM determines at each reporting point the number expNumFrames of data frames to be expected at the transceiver SE-B since the last reporting point, the number arrNumFrames of data frames arriving at the transceiver SE-B since the last reporting point and the number lostNumFrames of lost data frames since the last reporting point.

In this case the number expNumFrames of data frames to be expected since the last reporting point is calculated as follows:

$$expNumFrames = \frac{t_{Berichtzeitpunkt} - t_{letzter\ Berichtzeitpunkt}}{\Delta t}.$$

where "Berichtzeitpunkt" refers to a reporting point and "letzter" refers to last.

The number arrNumFrames of data frames arriving at the transceiver SE-B since the last reporting point is produced by adding the number of received fill frames SID multiplied by the factor X (in the present exemplary embodiment with the factor X=3) and the number of received payload data frames VP:

arrNumFrames=$\Sigma VP + X \cdot \Sigma SID$.

The number lostNumPak of data frames lost since the last reporting point is calculated as follows:

lostNumFrames=expNumFrames−arrNumFrames.

As previously shown "Voice Activity Detection" is defined in such a way that the send unit sends a further fill frame SID if the ambient noise exceeds a limit value that can be set. This can lead to the effect of fill frames SID being sent at an interval that is less than $\Delta T$=90 ms. In such cases, with the method in accordance with the invention, a negative value would be produced for the number lostNumFrames of data frames lost since the last reporting point. In such cases the number lostNumFrames of data frames lost since the last reporting point is set to the value lostNumFrames=0, i.e. no data packets are lost.

As already detailed in the introduction to the disclosure, the ratio of the number lostNumFrames of data frames lost during data transmission to the number expNumFrames of data frames expected at the recipient is used a measure for transmission quality in a packet-oriented network.

This ratio frakLost is calculated as follows:

$$frakLost = \frac{lostNumFrames \cdot 256}{expNumFrames}.$$

For better presentation the number lostNumFrames of the data frames lost since the last reporting point is multiplied by 256. This means that a value of frakLost=0 indicates that no data frames have been lost. A value of fraklost=256 indicates that all data frames have been lost. If at I reporting points—for example with I=2, 3, 4, 5, etc.—a consecutive value of fraklost=256 is produced, this means that the connection between the first and the second terminal PC-A, PC-B is interrupted.

Furthermore there is the option of defining a threshold value—lying between 0 and 256—for the ratio fraklost, and if this threshold is exceeded, classifying the connection as bad and having to take suitable action.

FIG. 3 is a block diagram for comparing how the transmission quality is determined in the prior art using the RTCP Standard and how it is determined in accordance with the present invention. To simplify the presentation the diagram assumes a special case, in which one data frame is transferred in one data packet. In cases in which a number of data frames are transmitted in one data packet, the method would have to be adapted accordingly.

In this payload data packets VP are received at the transceiver SE-B at points t=30 ms, t=60 ms, t=90 ms, t=120 ms, t=210 ms and t=240 ms. The received payload data packets VP in this case are numbered 1, 2, 3, 4, 7 and 8. The payload data packets VP with the packet number 5 and 6 have been lost during transmission over the IP-oriented network IP-N or the payload data packets have still not arrived at transceiver SE-B by point t=270.

In the present exemplary embodiment the transmission quality QoS (Quality of Service) is determined every 60 ms, i.e. if there is error-free data transmission between 2 reporting points 2 payload data packets VP will be received at the transceiver SE-B. For the reporting points t=60 ms and t=120 ms there is no difference with the method according to the RTCP Standard and the method in accordance with the invention in determining the transmission quality QoS.

At reporting point t=180 ms the method in accordance with the invention detects that between the reporting points, i.e. between t=120 ms and t=180 ms, no data packets and thus no data frames either were received at the transceiver SE-B. Thus for the number of data frames lost since the last reporting point t=120 ms this produces the value lostNumFrames=2 and for fraklost=256. This results in a transmission quality of QoS=0.

With the method according to the RTCP Standard, as has already been noted in the Background of the Invention, only the packet number of the last data packet received is taken into account. Since at reporting point t=180 ms all payload data packets VP up to packet number 4 were received at the transceiver SE-B, a value of QoS=1 is produced for the transmission quality QoS.

At reporting point t=240 ms the method in accordance with the invention determines that between the reporting points, i.e. between t=180 ms and t=240 ms, 2 data packets were received at the transceiver SE-B. Thus for the number lostNumFrames of data frames lost since the last reporting point t=180 ms, this produces the value lostNumFrames=0 and for ratio fraklost the value fraklost=0. The result is a transmission quality of QoS=1.

The method according to the RTCP Standard determines that at reporting point t=240 ms the payload data packet VP with the packet number 8 was received at the transceiver SE-B. It simultaneously detects that the payload data packets VP with the packet numbers 5 and 6 are missing. The result is that a value for the transmission quality QoS of QoS<1 is produced.

The method in accordance with the invention thus has the advantage over the method according to the RTCP Standard that the point at which a fault in data transmission over the IP-oriented network IP-N occurs can be determined exactly.

The invention has been described in detail with particular reference to preferred embodiments thereof and examples, but it will be understood that variations and modifications can be effected within the spirit and scope of the invention.

The invention claimed is:

1. A method for analysis of transmission quality in a packet-oriented network transmitting real-time critical data using payload data frames between terminals, comprising:
   transmitting fill frames at a minimum transmission rate at regular time intervals greater than a time interval of packets for speech signals from a first terminal to a second terminal when no real-time critical data is currently available for transmission; and
   determining a rate of lost data frames of payload data frames of the real-time critical data and the fill frames, based on the payload data frames and the fill frames received within a period of time at the second terminal,
   wherein said determining the rate of lost data frames of payload data frames and fill frames includes calculating a number of the lost data frames and calculating a value for a transmission quality as a number of the lost data frames within the period divided by an expected number of data frames within the period at the second terminal.

2. A method according to claim 1, wherein the minimum transmission rate produces a time between transmission of two fill frames that is a multiple X of payload data frame duration, wherein X has a value that is greater than 1.

3. A method according to claim 2, wherein the multiple X has a value that is variable and can be set.

4. A method according to claim 3, further comprising transmitting the value of X to the second terminal.

5. A method according to claim 4, further comprising determining a received number of data frames within the period, wherein said determining of the received number of data frames within the period at the second terminal includes calculating the number of fill frames received within the period multiplied by the value of X, plus a number of payload data frames received within the period.

6. A method according to claim 5, further comprising calculating the expected number of data frames within the period at the second terminal by dividing the period by the payload data frame duration.

7. A method according to claim 6, wherein said determining of the rate of lost data frames of payload data frames and fill frames includes
   calculating the number of data frames lost within the period by subtracting the received number of data frames within the period at the second terminal from the expected number of data frames within the period at the second terminal.

8. A method according to claim 7, wherein the payload data frame duration is different for different transceivers in the terminals.

9. An apparatus, comprising:
   an IP-oriented network transferring data via data packets;
   a first terminal unit operably connected to the IP-oriented network, the first terminal unit repeatedly transmitting fill frames for analysis of transmission quality over the IP-oriented network at a minimum transmission rate when real-time critical data is unavailable for transmission; and
   a second terminal unit operably connected to the IP-oriented network, the second terminal unit receiving the fill frames and payload data frames of the real-time critical data from the first terminal unit via the IP-oriented network and determining a rate of lost data frames of the payload data frames and the fill frames based on the payload data frames and the fill frames received within a period of time,
   wherein said determining of the rate of lost data frames of payload data frames and fill frames includes calculating a number of the lost data frames and calculating a value for a transmission quality as a number of the lost data frames within the period divided by an expected number of data frames within the period at the second terminal unit.

10. A method, comprising:
    transmitting fill frames via a network from a first terminal to a second terminal at a minimum transmission rate when real-time critical data is unavailable; and
    determining a rate at which frames of payload data frames of the real-time critical data and the fill frames are lost, based on the payload data frames and the fill frames received within a period of time by the second terminal,
    wherein said determining of the rate of lost data frames of payload data frames and fill frames includes calculating a number of the lost data frames and calculating a value for a transmission quality as a number of the lost data frames within the period divided by an expected number of data frames within the period at the second terminal.

11. A method, comprising:
    transmitting fill frames at a minimum transmission rate from a first terminal to a second terminal when no real-time critical data is currently available for transmission with a substantially equal time span between transmission of any two of the fill frames;
    determining a rate of lost data frames of payload data frames of the real-time critical data and the fill frames based on the payload data frames and the fill frames received within a period of time at the second terminal; and
    recognizing a connection as being interrupted if no payload data frame or fill frame is received at the second terminal within the time span after reception of a previous payload data frame or fill frame,
    wherein said determining of the rate of lost data frames of payload data frames and fill frames includes calculating a number of the lost data frames and calculating a value for a transmission quality as a number of the lost data frames within the period divided by an expected number of data frames within the period at the second terminal.

* * * * *